Nov. 26, 1963 I. SZALAY ETAL 3,112,457

TRANSISTOR PHASE MODULATOR

Filed Jan. 3, 1961 2 Sheets-Sheet 1

INVENTORS
ISTVAN SZALAY
RALPH ETHERINGTON
BY I David Blumenfeld
ATTORNEY

Nov. 26, 1963 I. SZALAY ETAL 3,112,457

TRANSISTOR PHASE MODULATOR

Filed Jan. 3, 1961 2 Sheets-Sheet 2

INVENTORS:
ISTVAN SZALAY,
RALPH ETHERINGTON,

BY I. David Blumenfeld
THEIR ATTORNEY.

3,112,457
Patented Nov. 26, 1963

3,112,457
TRANSISTOR PHASE MODULATOR

Istvan Szalay and Ralph Etherington, Lynchburg, Va., assignors to General Electric Company, a corporation of New York Filed Jan. 3, 1961, Ser. No. 80,187
6 Claims. (Cl. 332—29)

This invention relates to a solid state modulating circuit, and more particularly, to a simple transistorized circuit useful in frequency or phase modulated communication systems.

It is one of the primary objects of this invention, therefore, to provide a modulating circuit arrangement utilizing a single transistor phase modulating element.

Transistorized phase or frequency modulating circuits have been proposed from time to time in order to take advantage of the various benefits in terms of size, low power consumption, etc., associated with transistors. In general such prior art transistorized circuits were not modulating circuits as such but were directed to modulating the carrier oscillator directly. One such system which is typical of the class is illustrated and described in Patent No. 2,771,584, Thomas, issued Nov. 20, 1956, wherein the frequency of a feedback transistor oscillator is varied by controlling its alpha-cutoff frequency in response to a modulating signal. The phase of the current amplification factor $\alpha$ varies with the alpha-cutoff frequency, changing the phase shift around the feedback loop and causing the frequency of self-oscillation to vary in a predetermined manner. Phase modulated transistor oscillators of the type illustrated in the Thomas patent, however, have only been marginally useful in communication systems. They are unsatisfactory for a number of reasons, among which the most significant is lack of frequency stability.

It is, therefore, a further object of this invention to utilize a transistorized phase shifting circuit capable of providing phase deviations acting on an applied carrier signal;

A further object of this invention is to provide a phase shifting transistorized modulator circuit utilizing an alloy junction transistor;

Still another object of the invention is to provide a transistorized phase modulator circuit which is simple to manufacture, is stable in its operation, and provides a substantial linear relationship between the modulating signal and the phase deviation of the carrier signals;

Other objects and advantages of the invention will become apparent as the description thereof proceeds.

In accordance with the invention, the output admittance of a transistor phase modulating element associated with a tuned circuit is varied as a function of an applied modulating signal so that a varying reactance is present across the input terminals of the full section pi ($\pi$) network to phase modulate the carrier which is impressed thereon. A transit-time phase modulating effect also occurs within the transistor itself and increases the angular deviation range of the modulating circuit.

The novel features which are believed to be characteristic of this invention are set forth with particularity in the appended claims. The invention itself, however, both as to its organization and its advantages, may best be understood by reference to the following description taken in connection with the accompanying drawing in which:

Figure 1:
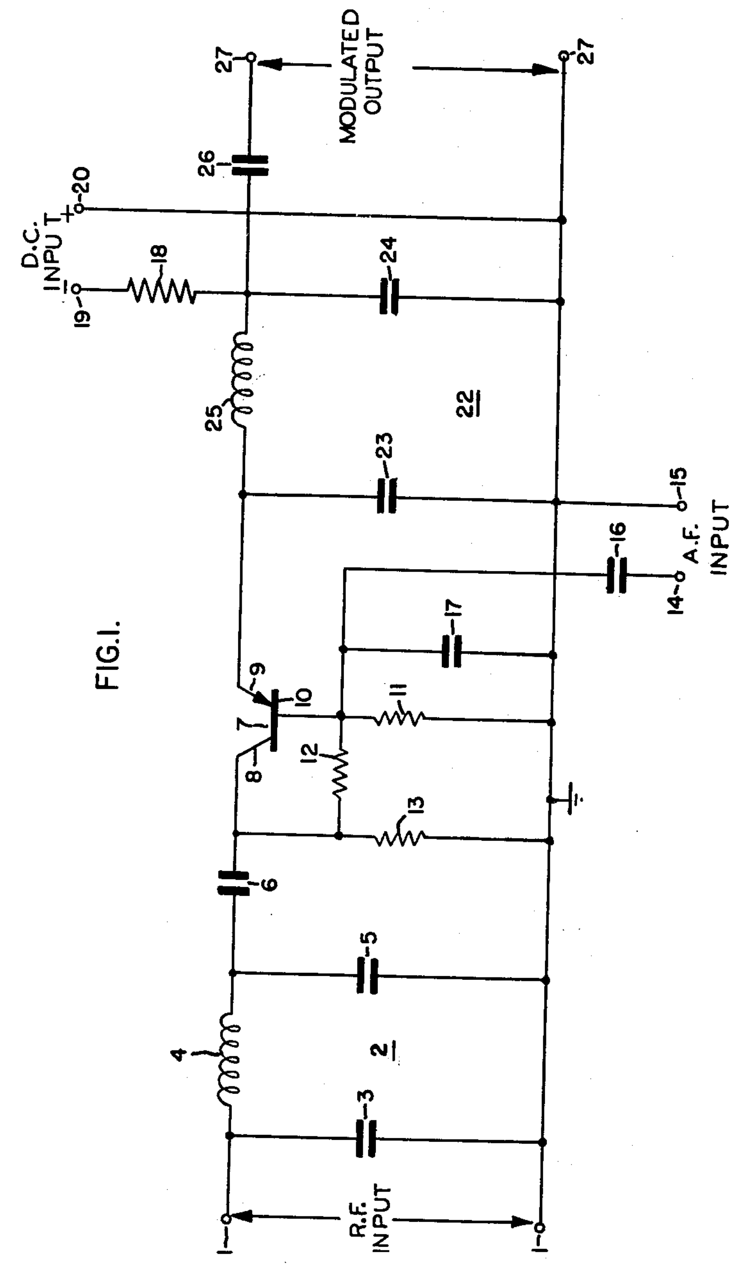
FIGURE 1 is a simple diagrammatic illustration of one embodiment of the transistor phase modulator.

One form of a circuit arrangement for carrying the invention into effect is illustrated by way of example in FIGURE 1 of the accompanying drawings. A high frequency carrier signal from any suitable source of oscillations is impressed across input terminals 1, 1 of an impedance matching pi ($\pi$) network 2 resonant at the carrier frequency. Pi ($\pi$) network 2 represents a $\frac{1}{4}\lambda$ lumped circuit element which acts as a $\pi$ impedance matching network having its cutoff-point at the carrier frequency $f_c$. The signal appearing across the network is applied through a coupling capacitor 6 to an input electrode of PNP transistor 7. Transistor 7, which is preferably an alloy junction transistor, includes an input electrode 8, an output electrode 9 and a base electrode 10. In accordance with the usual convention the transistor electrode, which is usually denominated as the "emitter" is illustrated by means of an arrow.

Although the emitter and collector elements of a transistor are identical from an electrical standpoint insofar as the type of impurity ($n$ or $p$) in the respective semiconductor layers, they are usually manufactured to have different physical characteristics and are normally not interchangeable in terms of connecting the transistor element into a circuit. In the phase modulator circuit of FIGURE 1, for reasons which will presently be described, the connections are reversed and the input electrode (emitter) is the one normally denominated by the manufacturer as the collector and the output electrode (collector) is the one denominated by the manufacturer as the emitter and is the one illustrated symbolically by means of the arrow.

A modulating voltage input resistance network comprising the three resistors 11, 12, and 13, is connected between base electrode 10, input electrode 8 and a source of reference potential represented by the grounded common bus. An audio frequency modulating signal from input terminals 14 and 15 is applied through coupling capacitor 16 across resistor 11 connected in the base circuit of the transistor 7. Resistance 11 is bypassed for R.F. by capacitor 17 connected in shunt therewith.

The base electrode of transistor 7 is connected to the grounded common bus through resistor 11 and the output electrode 9 is connected through a load resistance 18 and inductance 25 to the negative terminal 19 of a source of direct current biasing potential, the positive terminal of which is connected to the grounded bus. Transistor 7 is, therefore, biased in such a manner that the junction between electrodes 8 and 10 is forward biased and the junction between electrodes 9 and 10 is reversed biased. Electrode 8 is, therefore, functionally the emitter electrode and electrode 9 the collector electrode.

As shown in FIGURE 1, transistor 7 is connected in shunt with an output circuit 22 made up of capacitors 23 and 24 and inductance 25 connected as a pi ($\pi$) network, which has its cut-off point at the carrier frequency. The phase modulated carrier signal appearing across this resonant network is transmitted through coupling capacitance 26 to a pair of output terminals 27—27 which are connected to a suitable utilization circuit.

The modulating signal applied to base 10 varies the output admittance of transistor 7 so that a reactance varying with the applied modulating signal appears across resonant circuit 22 modulating the phase of the carrier signal. Furthermore, the mechanism by which the output admittance of transistor 7 is varied produces a secondary effect which increases the modulation range. The manner in which these various effects are produced in the illustrated circuit may be described as follows:

In general, the frequency of the modulating signal applied to the base electrode is low compared to the carrier signal, being generally in the audio range whereas the carrier is normally in the range of 1 to 8 megacycles. The modulating signal may therefore be considered as a slowly varying bias voltage which effectively varies the bias point of the transistor, i.e., changes both the emitter current, $I_E$, and the collector-base voltage $V_{CB}$ of the transistor, as a function of the modulating signal. The signal at base 10 affects the emitter-base junction voltage $V_{EB}$ because the voltage dividing action of resistances 12 and 13 connected across base resistance 11 applies a fraction of this voltage between electrodes 8 and 10. The emitter-base voltage variation in turn controls the emitter current $I_E$ flowing in the transistor 7.

The change in emitter current, as may be expected, produces a corresponding change in collector current. This in turn varies the collector potential with respect to the base since any change in collector current varies the voltage drop across resistance 18 and hence the potential at collector 9. Furthermore, in addition to changes of the collector potential resulting from changes in emitter and collector currents, the base-collector voltage $V_{EB}$ is further modified by the primary effect on the base potential of the modulation voltage applied directly to the base. A change of base potential, by the increment $\Delta V_B$, will therefore result in an appreciably larger change in the collector-base voltage $V_{CB}$. The following approximation of this change may be made:

$$\Delta V_{CB}=\Delta V_B+\Delta I_E \alpha_{BO} R18$$

where $\Delta V_{CB}$=the incremental change in the collector-base voltage;

$\Delta V_B$=the change in base potential due to the audio modulating voltage;

$\alpha_{BO}$=the ratio of the collector current to the emitter current for a given transistor; and (i.e. the gain)

$\Delta I_E$=the incremental change in emitter current for a change in the base emitter voltage.

Changes in collector-base voltage $V_{CB}$ as a function of the modulating signal vary the admittance characteristics of the transistor modulator element so that a reactance varying with the modulating signal appears across the input of resonant output circuit 22. The manner in which the output admittance of the transistor is varied in order to produce the desired phase modulation may be explained as follows: An electric field exists at the junction of any N-P diode which is of such a magnitude and polarity that a narrow region on either side of the junction interface is swept free of mobile charge carriers. This region, because it is devoid of carriers, is usually referred to as the "depletion layer." The "depletion layer" may be thought of as a non-conducting or dielectric region (being devoid of mobile carriers), bounded on either side by conducting regions. In other words, it may be compared to a capacitance having a plate separation equal to, and hence a magnitude proportional to, the width of the layer. This capacitance at the junction of the semiconductor elements is variously called the "transition layer" capacitance, "depletion layer" capacitance, "barrier" capacitance, or "space charge" capacitance. For the sake of consistency, however, all subsequent reference thereto in this application will be as the "depletion" capacitance.

The width of this depletion layer may be varied by applying an external variable biasing voltage across the junction so that the capacitance is a function of the magnitude and the polarity of the biasing voltage across the junction. That is, if the junction is reverse biased, i.e., an external biasing voltage is applied which has a polarity such that the field across the junction is increased, the depletion layer becomes wider and the capacitance decreases. Conversely, if the junction is forward biased, i.e., the external biasing voltage is such as to decrease the electric field across the junction, the depletion area is narrowed and the capacitance increased. As the base-collector voltage $V_{CB}$ varies in response to the modulating voltage applied to terminals 14 and 15, the depletion capacitance at the base-collector junction varies correspondingly and a varying capacitance appears across the input terminals of resonant circuit 22 modulating the phase of the R.F. carrier appearing across the output terminals of resonant circuit 22.

The range of phase deviation of the carrier signal is extended further by a second effect which takes place within the transistor itself. As was pointed out above, variations of the base-collector voltage produce a corresponding change in the width of the "depletion layer" at the base-collector junction of transistor 7 which produces a reactance variation and a phase modulating effect on output circuit 22. The variation in the width of this "depletion layer" has the further effect of modifying the effective width of the base layer, producing a variable transit time for the minority carriers in the base region.

This phenomenon may be understood more easily in view of the following considerations: For any given transistor the width of the layer of semiconducting material constituting the base is fixed. The mobile majority carriers from the emitter region, positive holes in the case of a PNP transistor, cross the emiter-base junction and then move through the base layer by a diffusion process. As this movement through the base layer is by diffusion, and the diffusion velocity is, therefore, constant, the transit time of the mobile carriers in the base is fixed by the width of the base. The "depletion layer," which has been defined as the region on either side of the junction which is devoid of mobile carriers and has an electric field impressed thereon, varies in response to the collector-base voltage. The width of the base, that is, that portion of the semiconductor which is field free and through which the minority carriers diffuse, as opposed to its physical width, also varies. Thus, if the depletion layer is extremely wide, the field base width and the distance through which the minority carriers must diffuse to reach the depletion layer where they are swept out by the electric field, is correspondingly reduced. Conversely, if the depletion layer is narrow, the field free base width across which the minority carriers diffuse is correspondingly increased.

In effect, a phenomenon which may be denominated as "base width modulation" takes place in response to base-collector voltage variations and this coupled with the fact that the diffusion velocity at which the minority carriers travel through the base is constant, introduces a variable transit time for these minority carriers. This variable transit time may be considered as a variable delay relative to the original carrier frequency and produces a phase modulation of the carrier signal. The total phase modulation of the carrier at output terminals 27—27 is thus the sum of the phase modulation produced by the variable capacitance appearing across resonant circuit 22 as well as that introduced by the base width modulation within transistor 7. Consequently, a large phase deviation of the carrier signal is possible by means of a phase modulating circuit of the type illustrated in FIGURE 1.

A phase modulation circuit such as the one illustrated in FIGURE 1 was constructed with the following exemplary values of the circuit components:

Transistor 7=alloy junction transistors 3N20, 2N508, 2N563.
$C_3$=56 μμf.
$C_5$=120 μμf.
$C_6$=180 μμf.
$C_{17}$=.006 μf.
$C_{16}$=10 μf.
$C_{23}$=56 μμf.
$C_{24}$=108 μμf.
$C_{26}$=47 μμf.
$R_{11}$=2.2K ohms
$R_{12}$=100 ohms
$R_{13}$=2.7K ohms
$R_{18}$=4.7K ohms The circuit thus constructed was tested by applying a 4 to 6 megacycle carrier and a 1,000 cycle audio frequency modulating voltage of ±6 volts was applied to the circuit. A frequency deviation of ±1½ radians was observed.

The transistor of FIGURE 1, as was briefly discussed before, is reverse connected, in a physical sense. The emitter (as normally specified by the manufacturer) is biased as a collector, i.e., reverse biased, and the collector (as specified by the manufacturer) is biased as an emitter, i.e., forward biased. That is, normally for a PNP transistor, the emitter and collector terminals are specified by the manufacturer and have slightly different physical characteristics in terms of size, etc. In the connection illustrated in FIGURE 1, the roles of the emitter and collector as specified by the manufacturer were reversed. The reason for this reversal is to permit higher magnitude of audio frequency voltage to be applied to the transistor modulator since the Zener breakdown potential of the collector-base diode, as specified by the manufacturer, is higher than for the emitter-base diode. In other words, the roles of emitter and collector are reversed around the base, thereby permitting higher voltages to be applied to the input diode without danger of Zener breakdown. A further increase in deviation is thus made possible by driving the modulator "harder." This particular circuit connection achieved by reversing the roles of the emitter and collector electrodes as specified by the manufacturer, is not, however, indispensable, since the invention may be practiced without this reversed connection.

Figure 2:
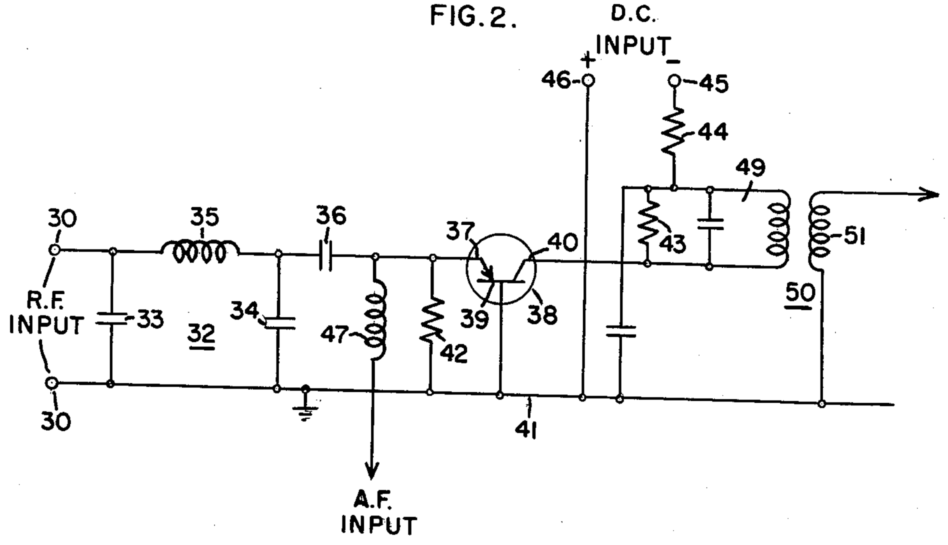
FIGURE 2 is an alternative embodiment of the novel transistor phase modulator.

FIGURE 2 illustrates an alternative embodiment of a phase modulator embodying the present invention. The R.F. carrier is impressed across the input terminals 30, 30 and is coupled through an impedance matching resonant pi ($\pi$) network 32 and a coupling capacitance 36 to the emitter electrode 37 of a PNP alloy junction transistor 38 connected in a common base configuration. Pi ($\pi$) network 32 consists of capacitors 33 and 34 and an inductance 35 and is resonant at the carrier frequency. Phase modulating transistor 38 also includes a base electrode 39 connected to a common bus 41 and a collector electrode 40. A biasing resistance 42 connected between the emitter 37 and the common bus 41 establishes the quiescent emitter current for the transistor and biasing voltage is supplied to the transistor from terminals 45 and 46 of a source of unidirectional energizing voltage. Collector electrode 40 is connected through the inductance of tuned circuit 49 and biasing resistance 44 to the negative terminal 45 of the source of energizing voltage and the grounded common bus 41 is connected to the positive terminal 46. A loading resistance 43 is connected in shunt with resonant circuit 49. A tuned L-C output circuit 49 resonant at the carrier frequency is connected to the collector electrode 40, the inductive element of which is the primary winding of an output transformer 50. Audio modulating voltage is impressed across the emitter-base input diode by means of an inductance coil 47 connected to the emitter and to the source of audio modulating voltage.

In a manner analogous to that described with reference to FIGURE 1, variation of the audio modulating voltage varies the emitter current. This produces a corresponding variation of collector current and a varying voltage drop across the dropping resistance 44. As a result, the base-collector voltage of phase modulating transistor 38 varies with the modulating voltage and in the manner described previously varies the output admittance of the transistor causing a varying capacitive reactance to appear across resonant output circuit 49. This results in a phase modulation of the R.F. carrier which is a direct function of the audio modulating voltage applied to the emitter of transistor 38. It will also be appreciated that a base width modulating effect and hence a transit time variation takes place to enhance the phase modulation of the carrier.

While a number of particular embodiments of this invention have been shown, it will, of course, be understood that the invention is not limited thereto since many modifications both in the circuit arrangement and in the various elements employed may be made. It is contemplated by the appended claims to cover any such modifications as fall within the true spirit and scope of this invention.

What is claimed as new and desired to be secured by Letters Patent is:

1. A modulating network including a junction transistor means having a forward biased junction and a reverse biased junction, input means for applying a radio frequency input of a fixed frequency to the forward biased junction, a modulating input signal connection coupled to said transistor for varying the biasing at said reverse biased junction to control the output admittance of said transistor whereby said radio frequency input is modulated within said network.

2. A modulating network including a junction transistor means having a forward biased junction, a reverse biased junction, and a base layer separating said junctions, input means for applying a radio frequency input of fixed frequency to the forward biased junction to produce a flow of mobile charge carriers across said forward biased junction through said base layer and across said reverse biased junction, modulating input means coupled to said transistor for varying the voltage across said reverse biased junction and thereby modulating the width of the base layer through which said mobile charge carriers travel so that the transit time of said carriers through the base and the phase of said radio frequency input is varied.

3. In a phase modulating network the combination comprising a junction transistor having a forward biased junction defining an input diode element, a reverse biased junction defining an output diode element, input means for applying a radio frequency signal of fixed frequency to said input diode to produce a flow of mobile charge carriers through the diode elements of said transistor, resonant circuit means coupled to said output diode means, and modulating input means coupled to said transistor for varying the voltage across said reverse biased junction and thereby simultaneously varying the transit time of the mobile carriers through said transistor and the admittance presented to said resonant circuit.

4. In a phase modulating network the combination comprising a junction transistor having an emitter, collector and base, means for applying a radio frequency signal of fixed frequency to said emitter, a resonant circuit coupled to said collector, base width modulating means for varying the carrier transit time and the output admittance of said transistor including means for impressing a modulating signal to vary the voltage and the depletion capacitance across the collector-base junction whereby the phase of the radio frequency signal is simultaneously varied in response to the transit time effect and the admittance variations presented to the resonant circuit.

5. In a phase modulating network the combination comprising an alloy junction transistor having an emitter, base and collector connected in a common base configuration, a radio frequency input connection to the emitter for impressing a fixed frequency radio signal on said transistor, a resonant circuit coupled to the collector, a modulating signal input connection to the base for varying the output admittance presented by said transistor to the resonant circuit and the transit time of mobile carriers within said transistor, said last named means including a resistance voltage dividing network for applying at least a portion of the modulating signal to the emitter to vary base-emitter voltage and thereby the collector current whereby the base-collector voltage is varied to control depletion layer capacitance and the transistor base width.

6. In a phase modulating network the combination comprising an alloy junction transistor including a body of semi-conducting material having emitter, base and collector portions connected in a common base configuration, a radio frequency input connection to the emitter portion for impressing a radio frequency signal having a fixed frequency, a resonant network coupled to said collector portion, means for simultaneously varying the output admittance presented by said transistor to the resonant circuit and the transit time of mobile charge carriers in the base portion of said body of semi-conducting material, said last named means including a resistance element connected to said base portion, a modulating signal input connection across said resistance element, a voltage divider connected across said resistance element, means connecting said emitter to said voltage divider to apply at least a portion of the modulating signal to the emitter for varying the base-emitter voltage and the collector current flowing in said transistor whereby the depletion layer capacitance at the collector-base junction and the base width is varied.

References Cited in the file of this patent

UNITED STATES PATENTS

| | | |
|---|---|---|
| 2,666,902 | Koros | Jan. 19, 1954 |
| 2,768,296 | Herzog | Oct. 23, 1956 |
| 2,825,810 | Zeidler | Mar. 4, 1958 |
| 2,851,540 | Theriault | Sept. 9, 1958 |
| 2,857,573 | Lin | Oct. 21, 1958 |
| 2,870,421 | Goodrich | Jan. 20, 1959 |
| 2,888,648 | Herring | May 26, 1959 |